United States Patent [19]

Myers et al.

[11] Patent Number: 4,811,208
[45] Date of Patent: Mar. 7, 1989

[54] STACK FRAME CACHE ON A MICROPROCESSOR CHIP

[75] Inventors: Glenford J. Myers; Konrad Lai, both of Aloha; Michael T. Imel, Beaverton; Glenn Hinton, Portland; Robert Riches, Hillsboro, all of Oreg.

[73] Assignee: Intel Corporation, Santa Clara, Calif.

[21] Appl. No.: 863,878

[22] Filed: May 16, 1986

[51] Int. Cl.⁴ ............................................. G06F 12/08
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 4,268,903 | 5/1981 | Miki et al. | 364/200 |
| 4,445,173 | 4/1984 | Pilat et al. | 364/200 |
| 4,516,203 | 5/1985 | Farber et al. | 364/200 |
| 4,530,049 | 7/1985 | Zee | 364/200 |
| 4,652,996 | 3/1987 | Bowden | 364/200 |

FOREIGN PATENT DOCUMENTS 0075632 of 0000 European Pat. Off. .
0075633 4/1983 European Pat. Off. .

*Primary Examiner*—Raulfe B. Zache
*Assistant Examiner*—Emily Y. Chan
*Attorney, Agent, or Firm*—Owen L. Lamb

[57] ABSTRACT

A plurality of global registers are provided on the microprocessor chip. One of a global registers is a frame pointer register containing the current frame pointer, and the remainder of the global registers are available to a current process as general registers. A plurality of floating point registers are also provided for use by the current process in execution of floating point arithmetic operations. A register set pool made up of a plurality of register sets is provided, each register set being comprised of a number of local registers. When a call instruction is decoded, a register set of local registers from the register set pool is allocated to the called procedure, and the frame pointer register is initialized. When a return instruction is decoded, the register set is freed for allocation to another procedure called by a subsequent call instruction. If the register set pool is depleted a register set associated with a previous procedure is saved in the main memory, and that register set is allocated to the current procedure. The local registers in a register set associated with a procedure contain linkage information including a pointer to the previous frame and an instruction pointer, thus enabling most call and return instructions to execute without needing any references to off-chip memory.

3 Claims, 3 Drawing Sheets

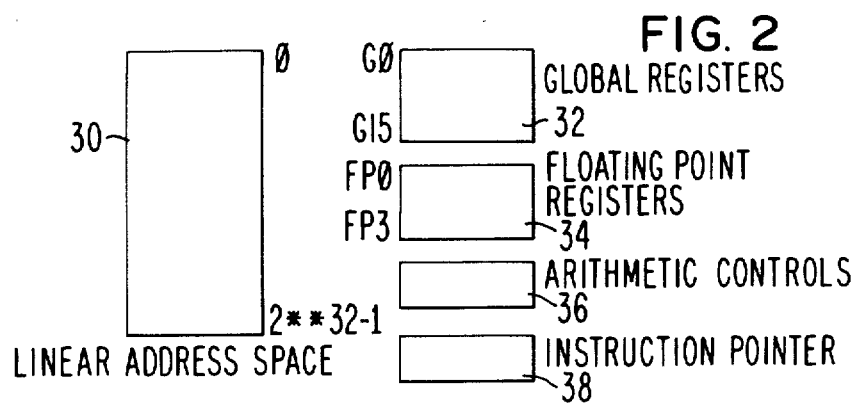
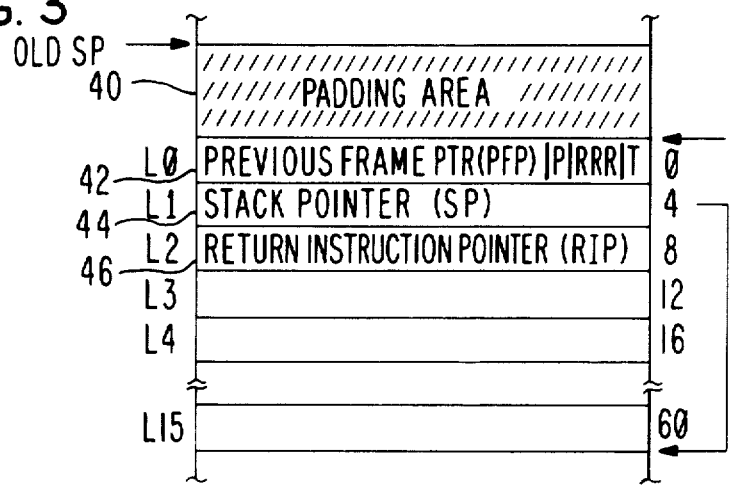
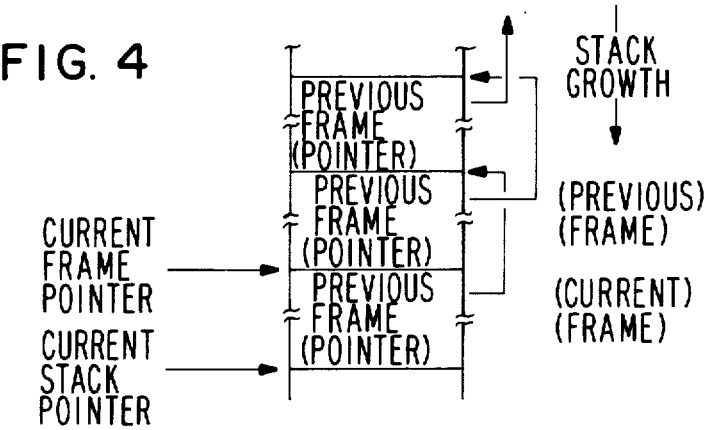

STACK FRAME CACHE ON A MICROPROCESSOR CHIP

TECHNICAL FIELD

The present invention relates to data processing systems, and more particularly to apparatus for minimizing main memory references initiated during execution of call/return instructions.

BACKGROUND ART

Rapid advances in VLSI technology and design techniques have enabled microcomputers to approach the performance and sophistication of a super minicomputer. As processors become faster, the traffic between the processor and off-chip main memory increases causing a performance bottleneck. In prior systems this bottleneck has been lessened by using a local on-chip memory (called a cache) to store frequently used memory data. If data required by the processor is in the cache, an off-chip memory reference is avoided since the data can be fetched directly from the cache. Further reductions in memory traffic could be achieved if the cache design were expanded to include instruction fetches. For example if information relating to call and return instructions were available locally on the chip, call and return instructions could execute without references to the off-chip memory. The resulting decreased memory bus traffic would also reduce the probability that a load or store instruction will have to wait for the memory bus.

It is therefore an object of the present invention to provide an apparatus for minimizing main memory references occurring during execution of call/return instructions.

SUMMARY OF THE INVENTION

Briefly, the above object is accomplished in accordance with the invention by providing a plurality of global registers on the microprocessor chip. One of the global registers is a frame pointer register containing the current frame pointer, and the remainder of the global registers are available to a current process as general registers. A stack frame cache mechanism is provided comprised of a register set pool made up of a plurality of register sets, each register set being comprised of a number of local registers on the chip. When a call instruction is decoded, a register set from the register set pool is allocated to the called procedure, and the frame pointer register is initialized. When a return instruction is decoded, the register set is freed for allocation to another procedure called by a subsequent call instruction. If the register set pool is depleted, the contents of a register set associated with a previous procedure are saved in the main memory, and that register set is allocated to the current procedure.

In accordance with an aspect of the invention, the local registers of a register set associated with a procedure contain linkage information including a pointer to the previous frame and an instruction pointer, thus enabling most call and return instructions to execute without needing any references to off-chip memory.

The invention has the advantage that it significantly reduces the saving and restoring of registers that must be done when crossing subroutine boundaries.

The invention also has the advantage that since the local register sets are mapped into the stack frames, the linkage information that normally appears in stack frames (e.g., pointer to previous frame, saved instruction pointer) is contained in the local registers. This means that most call and return instructions execute without causing any references to off-chip memory.

BRIEF DESCRIPTION OF THE DRAWINGS

The foregoing and other objects, features, and advantages of the invention will be apparent from the following more particular description of the preferred embodiments of the invention as illustrated in the accompanying drawings, wherein:

FIG. 2 is a block diagram of an execution environment when executing an instruction on the system shown in FIG. 1;

FIG. 3 is a diagram of the stack frame structure within the current linear address space of the execution environment shown in FIG. 2;

FIG. 4 is a diagram of the call stack structure within the current linear address space of the execution environment shown in FIG. 2; and, FIG. 5 illustrates the mapping of the microprocessor's register sets into the program's stack in memory.

DESCRIPTION OF THE PREFERRED EMBODIMENT

Figure 1:
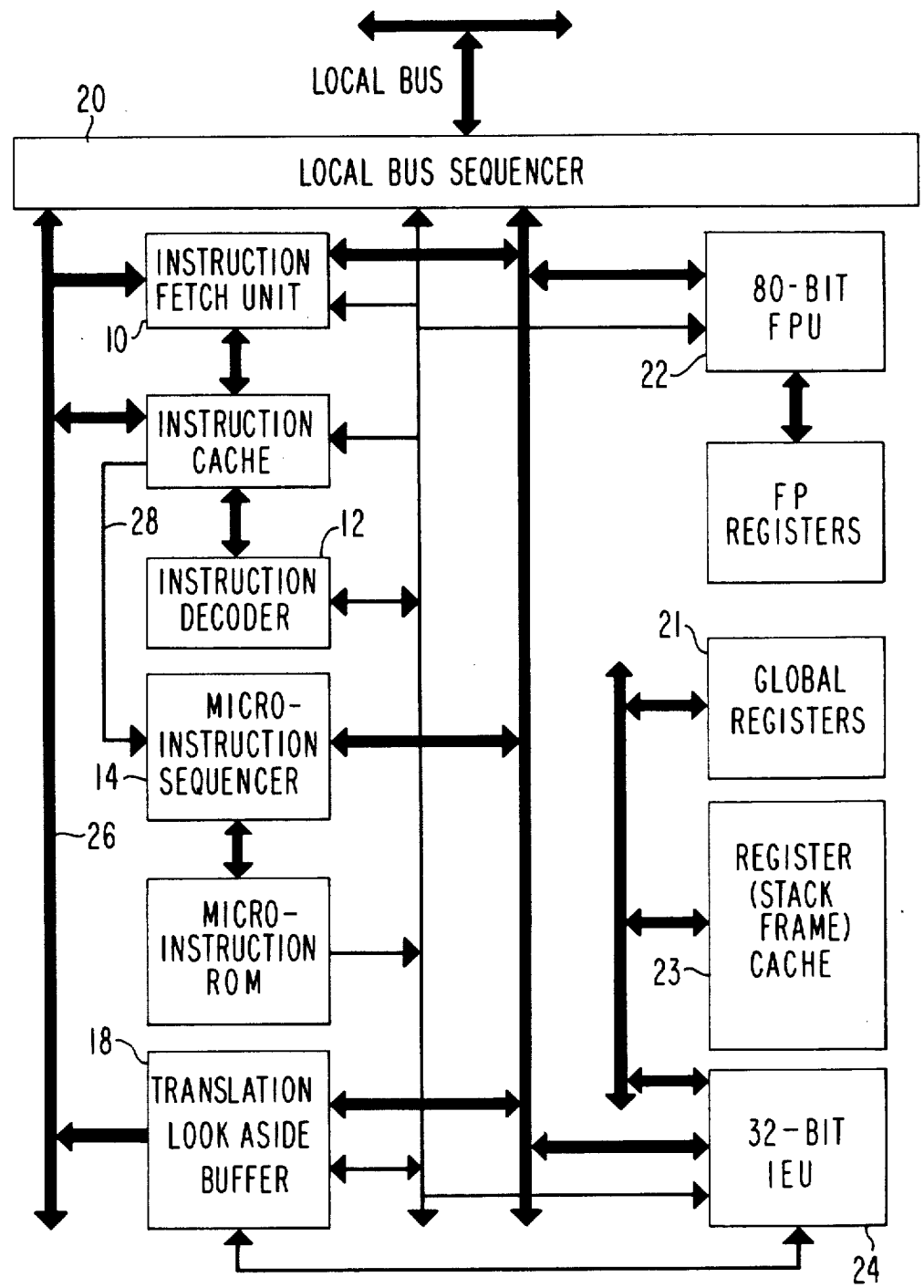
FIG. 1 is a functional block diagram illustrating each of the major components of the microprocessor in which the invention is embodied.

Referring now to FIG. 1, the microprocessor is logically subdivided into seven major units: the Instruction Fetch Unit (10), the Instruction Decoder (12), the Microinstruction Sequencer (14), Translation Lookaside Buffer (18), the Floating Point Unit (22), the Local Bus Sequencer (20), and the Integer Execution Unit (24).

Communication paths between all of these units include a 32-bit data bus, a 29-bit microinstruction bus (26), and a microinstruction-valid signal (28). The microinstruction bus controls and synchronizes the activities of the autonomous units. Each of the units is described briefly below.

The Instruction Decoder (ID) decodes and controls instruction (macrocode) execution. The ID decodes instructions, performs operand addressing and fetching, handles branch instructions (i.e., instruction pointer manipulation), and either emits execution microinstructions (for simple instructions) or starts microprogram flows (for complex instructions).

The Instruction Fetch Unit (IFU) fetches, prefetches, and caches instructions from memory for use by the ID. The IFU also maintains six instruction pointers that track instructions through the pipeline. The IFU caches the most-recently used blocks of instructions and keeps the instruction decoder supplied with a stream of instructions. It also contains the instruction pointers and operand reduction logic controlled by the ID.

The Microinstruction Sequencer (MIS) sequences microcode flows to handle chip initialization, macroinstructions that are too complex to handle directly, and exception and interrupt conditions.

The MIS contains a 3K by 42-bit microcode ROM and sequencing logic for microcode flows. The functions that the MIS perform include: fetch the next microinstruction, microprogram branching, handle exception conditions, maintain a scoreboard on the register file, and in conjunction with the ID, detect macroinstruction-boundary and trace events.

The Integer Execution Unit (IEU) executes most of the microinstructions issued by the ID and the MIS. It contains the registers visible to the programmer, the scratch registers used by microcode, the ALU, barrel shifter, and the logic needed to execute its instructions. The IEU contains one-hundred twelve 32-bit registers, a 32-bit ALU, and a 32-bit barrel shifter. It features an ALU bypass path that allows ALU operations to be executed at the rate of one per cycle. It also contains a single-port register file that can be accessed twice in one cycle such that the result from the previous operation can be stored in the same cycle as a new operand is being fetched for the current operation.

The Floating Point Unit (FPU) contains the logic needed to perform floating point operations, and integer multiply and divide. The FPU contains four floating point registers, several temporary registers, a 68-bit shifter that can shift up to 16 bits in either direction, a 69-bit mantissa adder, a significant bit finder, a mantissa ROM, two internal 68-bit data paths, and a separate exponent data path that includes its own 16-bit adder and registers. It executes integer multiply and divide, and all floating point operations, including the cordic algorithms for the transcendental instructions.

The Translation Lookaside Buffer (TLB) performs the address translation needed to implement virtual memory mechanisms. The TLB performs address translation and memory protection using an associative table of storage descriptors and page table entries. It contains a 48-entry address cache, a six-bit address adder, and memory protection checking hardware. Each entry in the address cache contains 27 CAM bits and 38 RAM bits. The TLB supports several address translation mechanisms to allow the user to choose the type of memory protection from a variety of conventional mechanisms (paging or segmentation).

The Local Bus Sequencer pipelines and sequences external bus accesses. The local bus sequencer contains the interface hardware to the external local bus, manages the bus protocol, and recognizes external events (e.g., interrupts, initialization). It contains an outgoing 33-bit wide address and data FIFO, an incoming 33-bit data FIFO, and a sequencer. The outbound FIFO allows up to 3 requests to be queued in the local bus sequencer so that the rest of the processor can proceed with execution, independent of the memory access latency. The inbound FIFO buffers read data returning from external memory until a free cycle is available to transfer the data to its destination.

A plurality of global registers (21) are provided. One of the global registers is a frame pointer register containing the current frame pointer, and the remainder of the global registers are available to a current process as general registers. A register (stack frame) cache (23) is provided comprised of a register set pool made up of a plurality of register sets, each register set being comprised of a number of local registers. When a call instruction is decoded, a register set from the register set pool is allocated to the called procedure, and the frame pointer register is initialized. When a return instruction is decoded, the register set if freed for allocation to another procedure called by a subsequent call instruction. If the register set pool is depleted, the contents of a register set associated with a previous procedure ae saved in the main memory, and that register set is allocated to the current procedure. The local registers of a register set associated with a procedure contain linkage information including a pointer to the previous frame and an instruction pointer, thus enabling most call and return instructions to execute without needing any references to off-chip memory.

Instruction Set

A process sees a flat linear address space, addressed with 32-bit ordinals, out of which it allocates data, instruction, and stack space. A call instruction creates a new stack frame (activation record) on a sequentially allocated stack.

The instruction set of the microprocessor is similar in design to those of RISC (reduced instruction-set computer) machines. All instructions are 32-bits in length and must be aligned on word boundaries, and only load, store, and branching instructions reference memory (all others reference registers).

Refer to FIG. 2 which shows the environment when executing. The execution environment consists of a $2**32$ byte linear address space (30) and thirty six registers. Of the thirty six registers, 16 are 32-bit global registers (32), sixteen are 32-bit local registers (34), and the remaining four are 80-bit floating-point registers (36). The local registers are associated with a mechanism known as the stack-frame cache. When a procedure is called, a new set of local registers are allocated from a pool of registers on-chip, and are freed by a procedure return. The present embodiment of the invention provides four sets (64) of local registers on-chip, but this number is transparent to the programmer.

The register model consists of 16 global registers and 4 floating-point registers that are preserved across procedure boundaries, and multiple sets of 16 local (or frame) registers that are associatively mapped into each stack frame.

At any instant, an instruction can address thirty six of these registers as follows:

| Register Type | Register Name |
|---|---|
| Global Register | G0 ... G15 |
| Floating-Point Register (floating-point operand) | FP0 ... FP3 |
| Local Register | L0 ... L15 |

At any point in time, one can address thirty-two 32-bit registers, and four 80-bit floating-point registers (the 32 registers can also be used to hold floating-point values). On the 32 registers, 16 are global registers and 16 are local registers. The difference is that the 16 global registers are unaffected when crossing procedure boundaries (i.e., they behave like "normal" registers in other processors local registers are affected by the call and return instructions.

When a call instruction is executed, the processor allocates to the called procedure a new set of 16 local registers from an on-chip pool of four register sets. If the processor's four-set pool is depleted, the processor automatically reallocates a register set by taking one register set associated with an earlier procedure and saving the contents of that register set in memory. The contents of the earlier procedure's register set are saved in the first 16 words of that procedure's stack frame in memory. Because of this, the mechanism is named the stack frame cache. The return instruction causes the current local register set to be freed (for use by a subsequent call).

There are sixteen global registers (32) associated with a process; they are saved in the process control block when the process is not executing. Global registers are not associatively mapped into the process control block.

Of the sixteen 32-bit registers, G15 contains the current frame pointer (FP) and G0 ... G14 are general-purpose registers. The FP contains the linear address (pointer) into the current execution environment for the current (topmost) stack frame. Since stack frames are aligned to 64-byte boundaries, the low-order 6 bits of FP are ignored and always interpreted to be zero. This register is initialized on calls and restored on returns.

A reference to a register as an operand that is bigger than 32 bits uses the registers with consecutive higher register numbers.

Floating-Point Registers

There are four floating-point registers (34) associated with a process; they are saved in the process control block when the process is not executing. Floating-point registers are not associatively mapped into the process contrl block.

Floating-point numbers are stored in extended real format in the floating-point registers. Floating-point registers are accessed only as operands of floating-point instructions (but such instructions may also use the 32-bit local and global registers).

Arithmetic Controls

The Arithmetic Controls (36) are used to control the arithmetic and faulting properties of the numeric instructions as well as for storing the condition codes. When a process is suspended, the arithmetic controls information is saved in the process control block.

Instruction Pointer

The Instruction Pointer (38) is a linear address (pointer)into the current linear address space to the first byte of the current instruction. Since instructions must begin on word (4-byte) boundaries, the two low-order bits of IP are ignored and assumed to be 0.

Local (or Frame) Registers

Refer to FIG. 3. Registers L0 ... L15, the local registers, do not denote registers of the conventional variety; they denote the first 16 words of the current frame. Thus, register L0 is mapped into linear address FP+0 to FP+3, register Li is mapped into linear address FP+4i to FP+4i+3, and so on.

A cache of multiple stack frames is provided. There are multiple banks of high-speed registers, one bank per procedure activation. The program does not have to save and restore registers explicitly.

Stack Frame

The stack frame, shown in FIG. 3, is a contiguous portion of current linear address space, containing data in a stack-like fashion. There is one stack frame per activated procedure, which contains local variables, parameters, and linkage information. A call operation acquires a new stack frame; a return operation releases it. When a new frame is acquired, it is aligned on a 64-byte boundary.

The fields in the stack frame of FIG. 3 are defined as follows:

Padding Area

This area (42) is used to align the FP to the next 64-byte boundary. The size of this area varies from 0 to 63 bytes. When a call operation is performed, a padding area is added to round the caller's SP to the next 64-byte boundary to form the FP for this frame. If the caller's SP is already aligned, the padding area is absent.

Frame Status (L0)

The frame status (42) records the information associated with the frame, after a call, to be used on a return from the frame. The fields of a frame status are defined as follows:

Trace Enable, T (Bit 0)

In a supervisor call, this bit records the trace-enable bit at the time of the call. On return, this bit is used to restore the caller's trace-enable bit in the process if the execution mode of the returning frame is supervisor.

Return Status, RRR (bits 1-3)

This 3-bit field records the call mechanism used in the creation of this frame and is used to select the return mechanism to be used on return. The encodings of this field are as follows:

| | |
|---|---|
| 000 | Local |
| 001 | Supervisor |
| 010 | Interrupt |
| 011 | Nonsubsystem fault |
| 100 | Subsystem |
| 101 | reserved |
| 110 | Idle/stopped interrupt |
| 111 | reserved |

Prereturn Trace, P (bit 4)

On a return from a frame when the prereturn trace bit is 1, a prereturn trace event (if enabled) occurs before any actions association with the return operation is performed. This bit is initialized to zero on a call.

Previous Frame Pointer, PFP (bit 6-31)

A linear address (42) to the first byte of the previous frame. Since frames are aligned to 64-byte boundaries, only the most-significant 26 bits of the FP are saved. If the return status indicates subsystem transfer, this field contains the most-significant 26 bits of the linear address of the top-most (last) frame in this call stack before the call. Otherwise, the top-most frame is the calling frame.

During a call, the lower five bits of the frame status are initialized as follows:

| | | |
|---|---|---|
| 0 | 000- | Local call, or supervisor call from supervisor state |
| 0 | 001T | Supervisor call from user mode |
| 0 | 010- | Interrupt call |
| 0 | 011- | Nonsubsystem fault call |
| 0 | 100- | Subsystem call |
| 0 | 110- | Interrupt call from idle or stopped state |

T is the value of the trace bit defined above. "-" indicates a reserved bit, while "x" indicates a don't-care bit.

On all returns, the bits are interpreted as follows:

| | | |
|---|---|---|
| 1 | xxxx | Generate a prereturn trace |
| 0 | 000x | Perform a local return |
| 0 | 001T | In supervisor mode, perform a supervisor return. The T bit is assigned to the trace-enable bit in the process controls, and the execution-mode bit is set to user. Otherwise, perform a local return. |
| 0 | 010x | Perform an interrupt return |

-continued

| 0 | 011x | Perform a fault return |
| 0 | 100x | Perform a subsystem return |
| 0 | 101x | OPERATION.RETURN fault |
| 0 | 110x | Perform an idle/stopped-interrupt return |
| 0 | 111x | OPERATION.RETURN fault |

Stack Pointer, SP (L1)

A linear address (44) to the first free byte of the stack, that is, the address of the last byte in the stack plus one. SP is initialized by the call operation to point to FP plus 64.

Return Instruction Pointer, RIP (L2)

When a call operation is performed to a new frame, the return IP (46) is saved here. When the process is suspended, the instruction pointer of the next instruction is stored here. It contains a 32-bit linear address to which control is returned after a return to this frame.

A procedure call saves the IP in a register of the current frame. Since implicit procedure calls can occur (due to faults and interrupts), programs do not use this register for other purposes.

The stack grows (FIG. 4) from low addresses to high addresses.

Figure 5:
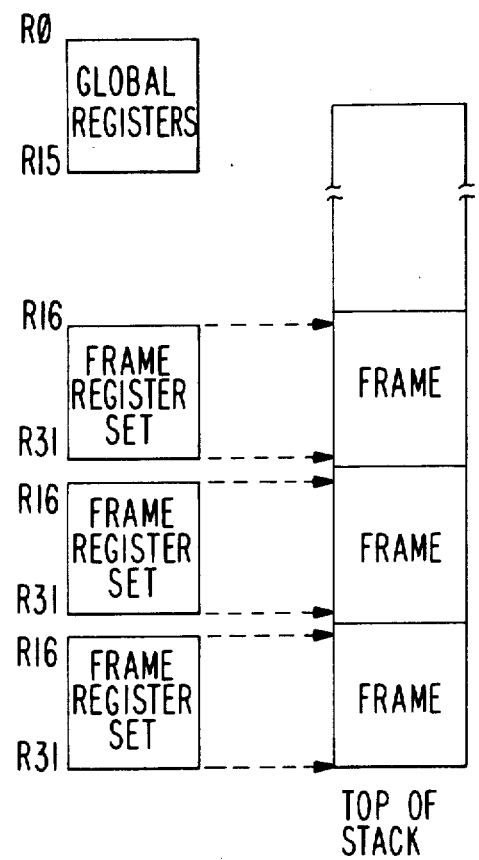

FIG. 5 illustrates the mapping of the microprocessor's register sets into the program's stack in memory.

The page, or simple object, into which the first 64 bytes of a frame are mapped must be of local lifetime. The lifetime of the page or simple object is checked during a call. This restriction is necessary to ensure efficient manipulation of ADs in the local registers.

Linear Address Space Structure

As shown in FIG. 2, each execution environment defines a 32-bit linear address space. The linear address space is partitioned into four regions. The first three regions of an execution environment are specific to the current process (i.e., defined by the process control block). The composition of the process specific regions can be changed by a subsystem call/return. The fourth region of an execution environment is shared by all processes (i.e., defined by the processor control block). There are no restrictions on where instructions, stack frames, or data are located in the linear address space.

Local Procedure Mechanism

A procedure begins at any arbitrary word address in a linear-address space. Procedure calls and return use a stack in the linear address space.

Instructions

CALL
CALL_EXTENDED
CALL and CALL_EXTENDED invoke the procedure at the address specified. CALL specifies the procedure as IP plus a 24-bit signed displacement. CALL_EXTENDED specifies the procedure using a general memory effective address. CALL_EXTENDED also contains an operand which becomes AP in the new frame.

A new stack frame is allocated during the call operation and the control flow is transferred to the specified procedures. The execution environment remains unchanged.

RETURN

The RETURN instruction transfers control back to the calloing procedure's addressing environment and releases the called procedure's stack frame. Instruction execution is continued at the instruction pointed to by the RIP in the calling procedure's frame.

MODIFY_AC
CONVERT_ADDRESS

MODIFY_AC is used to read or modify the current arithmetic controls. Because the region ADs are not directly accessible, the CONVERT_ADDRESS instruction can be used to convert a linear address into a virtual address.

Process Management

A software process or task, is represented by a process control block. Two means are provided for the control of process switching. One is via two instructions (save_process and resume_process), which allow an operating system to switch processes explicitly. Another is a priority-based process scheduling and dispatching function that is built into the processor. Using the latter mechanism, the processor will automatically dispatch processes from a queue in memory.

The processor keeps track of the cumulative execution time of each process, and also provides optional time-slice management. For the latter, whenever a process executes for longer than a prescribed amount of time, the processor will generate a fault, or enqueue the process on the queue of available processes and dispatch another process.

When automatic process dispatching is used, a set of interprocess communication instructions are provided, which are similar to services normally provided in software operating-system kernels. They provide support for the communication of messages among processes.

Tracing and ICE Support

Software debugging and tracing is provided by means of a trace-controls register that is part of each process. The trace controls allow detection of any combination of the following events:
Instruction execution (i.e., single step)
Execution of a taken branch instruction
Execution of a call instruction
Execution of a return instruction
Detection that the next instruction is a return instruction
Execution of a supervisor or subsystem call
Breakpoint (hardware breakpoint or execution of a breakpoint instruction)

When a trace event is detected, the processor generates a trace fault to give control to a software debugger or monitor. The processor contains two instruction breakpoint registers, into which a debugger can place the addresses of two instructions.

External Bus

The microprocessor's bus is a 32-bit multiplexed bus with burst-transfer capability. The burst-transfer mechanism (which allows multiple words to be transferred in successive cycles) allows the bus to be defined as multiplexed. Burst transfers can occur for 1, 2, 3, or 4 words. During the address cycle, the processor indicates the number of words in the request in the low-order two address bits. For instance, if the processor wishes to read four words, the bus operation isn't terminated until for READY's are received. Burst-transfer operations are used often by the processor for instruction-cache fills, stack-frame-cache saves and restores, multiword loads and stores, string operations, and so on.

The microprocessor is highly pipelined. There are normally five instructions in different stages of execution in the pipeline at any given moment. In any given cycle, the instruction pointer to instruction n+4 is computed, instruction n+3 is read from the instruction cache, instruction n+2 is decoded and issued to the microinstruction bus, instruction n+1 is being executed, and the result of instruction n is being stored into the register file.

While the invention has been particularly shown and described with reference to preferred embodiments thereof, it will be understood by those skilled in the art that the foregoing and other changes in form and detail may be made therein without departing from the spirit and scope of the invention.

What is claimed is:

1. A data processor fabricated on an integrated circuit chip, said data processor including an instruction execution unit (24), said data processor having a main memory bus (local bus) for connecting said data processor to a main memory, said main memory being external to said chip, said main memory having stored therein first program instructions of a first process and program instructions of a second process, said first instructions including a call instruction for calling said second process, said data processor having a register (stack frame) cache (23), the improvement in said data processor comprising:

- a plurality (G0–G15) of global registers (21) on said integrated circuit chip, one (G15) of said global registers being a frame pointer register containing a current frame pointer which points to a current frame corresponding to a current process running on said processor, and the remainder of said global registers being general registers available to said current process;
- a register set pool in said register cache (23) on said integrated circuit chip made up of a plurality of register sets, each register set being comprised of a number of local registers;
- address translation means (18, 24) connected to said register cache (23) for mapping said local registers onto corresponding frames in the address space of said main memory external to said chip;
- said frame pointer register (G15) including a frame pointer which points to an earlier allocated register set;
- said local registers of each register set providing space for storing linkage information including a previous frame pointer (H6) which contains the address of a location in said main memory of the last previously activated frame and a return instruction pointer (RIP) which contains the instruction pointer of the next sequential instruction in the instruction stream of the process that had created the frame to which said register set corresponds;
- a first one of said register sets being allocated to said first process;
- an internal bus in said processor connecting together said register cache (23), said global registers (21) and said instruction execution unit (24);
- said global registers (21) and said local registers (23) being addressable over said internal bus by microinstructions executed by said instruction execution unit (24) in said data processor;
- an instruction decoder (12) connected to said instruction execution unit (24); and,
- control means (14) in said processor, responsive to said instruction decoder (12) and activated upon the decoding by said instruction decoder (12) of said call instruction of said first process, for allocating to said second process, a second register set of local registers from said register set pool in said register cache (23) and for placing in said frame pointer register (G15) a current frame pointer which points to said second register set,
- said control means (14) including means for transferring, over said main memory bus (local bus) to said main memory, the contents of an earlier allocated register set previously allocated to an earlier activated process, and for reallocating said earlier allocated register set to said current process, by placing in said frame pointer register (G15) the frame pointer which points to said earlier allocated register set.

2. The combination in accordance with claim 1 wherein said first control means (14) includes means activated upon the decoding of a return instruction in the instruction stream of said second process for transferring over said main memory bus (local bus) to said main memory, the contents of said second register set allocated to said second process from said register set pool and for placing in said frame pointer register (G15) the previous frame pointer stored in said second register set, said previous frame pointer stored in said second register set pointing to said first one of said register sets, thereby providing the means by which instruction execution by said first process is resumed from the point in the instruction stream pointed to by said return instruction pointer (46) of said first said register set.

3. The combination in accordance with claim 1 wherein said previous frame pointer includes bits comprising a linear address of the first byte of the previous frame.

* * * * *

UNITED STATES PATENT AND TRADEMARK OFFICE
CERTIFICATE OF CORRECTION

PATENT NO. : 4,811,208
DATED : March 7, 1989
INVENTOR(S) : Myers, et al.

It is certified that error appears in the above-identified patent and that said Letters Patent are hereby corrected as shown below:

Column 8, line 2, change "calloing" to -- calling --;
Column 9, line 1, change "for" to --four --;

Signed and Sealed this

Second Day of July, 1996

Attest:

BRUCE LEHMAN

Attesting Officer

Commissioner of Patents and Trademarks